United States Patent
Lassalle et al.

(10) Patent No.: US 10,717,517 B2
(45) Date of Patent: Jul. 21, 2020

(54) HYDRAULIC ACTUATION SYSTEM

(71) Applicant: Ratier-Figeac SAS, Figeac (FR)

(72) Inventors: Julien Lassalle, Saint Jean Lagineste (FR); Thibaut Marger, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 62 days.

(21) Appl. No.: 15/969,887

(22) Filed: May 3, 2018

(65) Prior Publication Data

US 2018/0327082 A1     Nov. 15, 2018

(30) Foreign Application Priority Data

May 11, 2017  (EP) .................................... 17305533

(51) Int. Cl.
| | | |
|---|---|---|
| *B64C 11/40* | (2006.01) | |
| *F15B 13/043* | (2006.01) | |
| *F15B 11/042* | (2006.01) | |
| *F15B 13/16* | (2006.01) | |

(52) U.S. Cl.
CPC .......... *B64C 11/40* (2013.01); *F15B 11/0423* (2013.01); *F15B 13/0438* (2013.01); *F15B 13/16* (2013.01); *F15B 2211/20546* (2013.01); *F15B 2211/50536* (2013.01); *F15B 2211/6309* (2013.01); *F15B 2211/6313* (2013.01); *F15B 2211/6336* (2013.01); *F15B 2211/6652* (2013.01); *F15B 2211/6653* (2013.01); *F15B 2211/6656* (2013.01)

(58) Field of Classification Search
CPC .............................. B64C 11/40; F15B 13/16
See application file for complete search history.

(56) References Cited

U.S. PATENT DOCUMENTS

| | | | | |
|---|---|---|---|---|
| 3,242,992 A | * | 3/1966 | Quenneville | B63H 3/082 416/157 R |
| 4,139,987 A | * | 2/1979 | Budzich | F04B 49/08 60/445 |
| 4,747,335 A | | 5/1988 | Budzich | |
| 4,822,243 A | * | 4/1989 | Poucher | B64C 11/38 416/157 R |
| 5,794,438 A | * | 8/1998 | Lisniansky | F04B 49/08 60/327 |

(Continued)

FOREIGN PATENT DOCUMENTS

| | | | | |
|---|---|---|---|---|
| GB | 714903 A | * | 9/1954 | ............ B64C 11/30 |
| GB | 714903 A | | 9/1954 | |
| WO | 2015148012 A1 | | 10/2015 | |

OTHER PUBLICATIONS

Extended European Seach Report for International Application No. 17305533.6 dated Nov. 15, 2017, 7 pages.

(Continued)

*Primary Examiner* — Woody A Lee, Jr.
(74) *Attorney, Agent, or Firm* — Cantor Colburn LLP

(57) ABSTRACT

Disclosed herein is a hydraulic actuator system comprising a servoactuator including a hydraulic actuator and a control valve, wherein the supply of hydraulic fluid to the servoactuator from a fluid supply is adjustable through a control system based on feedback information relating to the servoactuator. The hydraulic actuator system may e.g. be used for controlling blade pitch in a variable pitch propeller system such as may be found on a turboprop aircraft or a ship.

14 Claims, 5 Drawing Sheets

(56) References Cited

U.S. PATENT DOCUMENTS

| | | | |
|---|---|---|---|
| 6,170,262 B1 | 1/2001 | Yoshimura et al. | |
| 6,623,247 B2 * | 9/2003 | Du | F04B 1/324 |
| | | | 417/213 |
| 9,169,783 B2 * | 10/2015 | Kleckler | F02C 9/58 |
| 2013/0145926 A1 * | 6/2013 | Koeckemann | F15B 11/0426 |
| | | | 91/363 R |

OTHER PUBLICATIONS

EPO Official Letter for Application No. 17305533.6, filed Mar. 12, 2020, 6 pages.

* cited by examiner

HYDRAULIC ACTUATION SYSTEM

FOREIGN PRIORITY

This application claims priority to European Patent Application No. 17305533.6 filed May 11, 2017, the entire contents of which is incorporated herein by reference.

TECHNICAL FIELD

The present disclosure relates generally to hydraulic actuation systems, and particularly to control systems for and methods of controlling hydraulic actuation systems.

BACKGROUND

Hydraulic actuation systems are known for providing mechanical control of movable elements within various systems or vehicles including aircraft and ships. For example, a hydraulic actuation system may be used to adjust the pitch of the propeller blades of a variable-pitch propeller.

A hydraulic actuation system generally comprises a hydraulic actuator comprising a cylinder and a piston that slides within the cylinder, and a valve (such as an electrohydraulic servo valve (EHSV)) for controlling how hydraulic fluid is ported to the cylinder, and hence controlling the position of the piston within the cylinder. The combination of the hydraulic actuator and a servovalve may be referred to as a "servoactuator". The hydraulic actuator may generally be single acting, such that hydraulic pressure is applied to just one side of the piston, or double acting, such that hydraulic pressure is applied on each side of the piston whereby the pressure difference between each side causes the piston to move.

SUMMARY

From a first aspect, there is provided a hydraulic actuation system comprising: a servoactuator comprising a hydraulic actuator and a control valve for controlling porting of hydraulic fluid to the actuator; and a fluid supply controller for controlling a supply of hydraulic fluid from a fluid supply to the servoactuator, the fluid supply controller comprising a feedback system for receiving information relating to the operation of the hydraulic actuation system, the fluid supply controller configured to adjust the supply of hydraulic fluid based on the information.

The fluid supply controller may act to adjust the supply pressure $P_S$ at which the hydraulic fluid is supplied to the servoactuator.

The fluid supply may comprise a reservoir and a pump for retrieving hydraulic fluid from the reservoir and pumping the hydraulic fluid to the servoactuator.

The fluid supply controller may comprise an adjustable pressure regulating valve operatively associated with the fluid supply for adjusting the pressure at which the hydraulic fluid is supplied to the servoactuator.

The fluid supply controller may comprise a self-regulating pressure supply or pump.

The information may comprise information relating to the operation of the actuator such as a pressure and/or differential pressure associated with the hydraulic actuator or with one or more chambers of the hydraulic actuator.

The information may comprise information relating to the operating of the control valve and/or information relating to the pressure at which the hydraulic fluid is supplied to the servoactuator.

The information may comprise a position and/or a target position of the hydraulic actuator.

The information may comprise information relating to the environment, e.g. relating to an aircraft or ship, within which the actuator system is installed.

The system may comprise a position feedback loop for determining a target position and/or target actuation rate of the hydraulic actuator, wherein the fluid supply controller adjusts the supply or supply pressure of hydraulic fluid to the servoactuator based on information obtained from the position feedback loop.

The system may comprise one or more pressure and/or flow monitors for monitoring the operation of the hydraulic actuator and/or control valve and/or for monitoring the pressure at which the hydraulic fluid is supplied to the servoactuator.

The control valve may comprise a servovalve, such as an electrohydraulic servovalve. Alternatively, the control valve may comprise a direct drive valve, or a hydromechanical valve.

From another aspect, there is provided a variable pitch propeller system comprising a hydraulic actuation system substantially as described herein, wherein the hydraulic actuator is operatively connected to a propeller blade for adjusting the pitch of the propeller blade.

There is also provided an aircraft, turboprop aircraft or a ship comprising a hydraulic actuation system or a variable pitch propeller system substantially as described herein. The fluid supply may comprise a supply of lubricant from an engine of the aircraft or ship.

From a further aspect, there is provided an aircraft, turboprop aircraft or a ship comprising a hydraulic actuation system, the hydraulic actuation system comprising: a servoactuator comprising a hydraulic actuator and a control valve for controlling porting of hydraulic fluid to the actuator; and a fluid supply controller for controlling a supply of hydraulic fluid from a fluid supply to the servoactuator, the fluid supply controller comprising a feedback system for receiving information relating to the operation of the hydraulic actuation system and/or information relating to the operation of the aircraft or ship, the fluid supply controller being configured to adjust the supply of hydraulic fluid based on the information.

Any of the hydraulic actuation systems, variable pitch propeller systems, or aircrafts, turboprop aircrafts or ships described herein may comprise a hydrodynamic bearing allowing relative rotation between the hydraulic actuator and the fluid supply.

BRIEF DESCRIPTION OF THE DRAWINGS

Various arrangements and embodiments will now be described, by way of example only, and with reference to the accompanying drawings in which.

DETAILED DESCRIPTION

Figure 1:
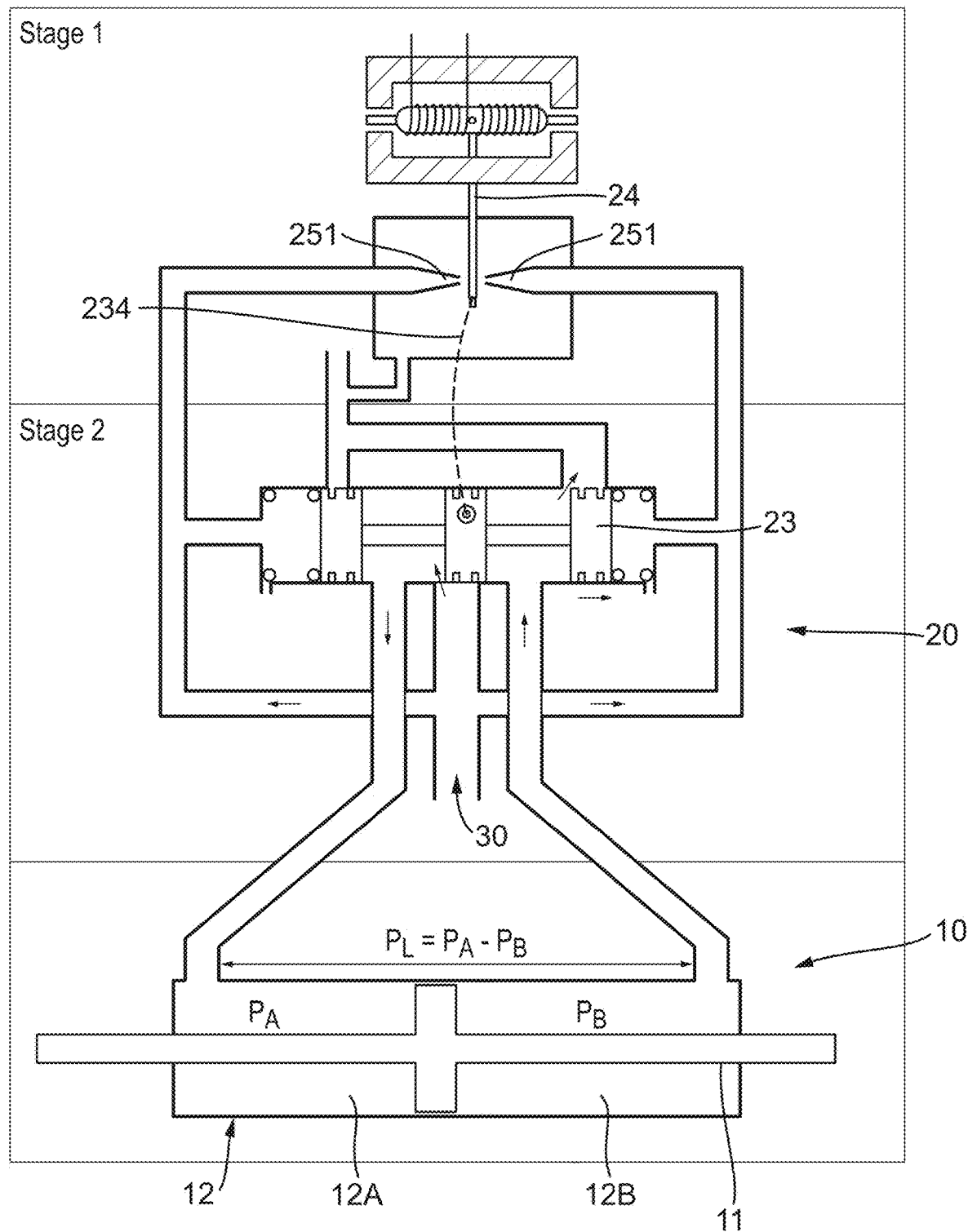
FIG. 1 shows a servoactuator.

FIG. 1 shows a schematic of a servoactuator comprising a control valve 20 and a hydraulic actuator 10. The actuator 10 comprises a piston 11 that slides within a cylinder 12 composed of a first chamber 12A and a second chamber 12B. The piston 11 acts to prevent direct fluid communication between the first chamber 12A and the second chamber 12B. Assuming that the piston 11 is symmetrical, the load pressure $P_L$ on the piston 11 is thus given by the differential pressure acting on the piston between the two chambers, i.e. $P_L = P_A - P_B$, wherein $P_A$ is the pressure in the first chamber $12_A$ and $P_B$ is the pressure in the second chamber $12_B$. Although the piston 11 shown in FIG. 1 is double-acting, it will be appreciated that the techniques described herein may equally be applied to other types of hydraulic actuators, for example, including single-acting pistons.

Hydraulic fluid is provided to the servoactuator via a supply line 30 which may generally be connected to a hydraulic fluid reservoir and a pump. As shown in FIG. 1, the hydraulic fluid is provided from the supply line 30 to the control valve 20, and then from the control valve 20 to the hydraulic actuator 10. Thus, the control valve 20 acts to control the porting of hydraulic fluid to the actuator 10. In particular, the control valve 20 acts to control the relative porting of the hydraulic fluid to the first chamber 12A and the second chamber 12B of the actuator 10 so as to vary the rate of hydraulic fluid flow to the chambers, and hence the load pressure $P_L$ and the position of the piston 11. The control valve 20 thus controls the output of the hydraulic actuator 10.

In FIG. 1 the control valve 20 is embodied as an electro-hydraulic servovalve (EHSV) which is generally controlled through an electrical signal. Servovalves are typically used when accurate position control is required (such as control of a primary flight control surface, or a blade pitch controller), and position control is generally achieved through a closed-loop control system consisting of a command sensor, a feedback sensor, a digital or analogue controller and the servovalve. Advantageously, by using a servovalve a relatively low power electrical signal can be used to accurately position the actuator 10. Thus, the control valve 20 may generally comprise a spool 23 and a device such as a flapper 24/nozzle 251 or jet pipe (not shown) for positioning the spool 23. For the flapper/nozzle type valve shown in FIG. 1, the position of the flapper 24 controls the pressure in the two chambers of the spool 23. So, applying a suitable current to the flapper 24 moves the flapper 24, and hence introduces a different pressure across the spool 23, causing the spool 23 to move to one side or the other. A feedback rod or spring 234 is connected between the flapper 24 and the spool 23. Movement of the spool 23 to one side will port hydraulic fluid to the first chamber 12A whereas movement of the spool 23 to the opposite side will port hydraulic fluid to the second chamber 12B. The control valve 20 shown in FIG. 1 is a two-stage valve: the first stage being the flapper/nozzle and the second stage being the servo. Each stage provides a hydraulic force amplification. Thus, the flapper/nozzle stage converts a low power electrical signal to a differential pressure across the spool 23, and the spool 23 in turn amplifies this differential pressure onto the actuator 10 e.g. by varying the flow rate.

It will be appreciated that the servovalve configuration shown in FIG. 1 is not limiting, and various other configurations may be used. For instance, it is contemplated that servovalves having more than two, such as three, stages may be used. Also, as mentioned above, it is contemplated that the first stage may comprise a jet pipe rather than a flapper/nozzle. Moreover, it will be understood that various other types of control valve may suitably be used to control the porting of hydraulic fluid to the actuator 10, and the control valve 20 need not be a servovalve. For example, the control valve 20 may comprise a direct drive valve, optionally incorporating a linear variable differential transformer on the second stage. As other examples, the control valve 20 may comprise a (fully) hydro-mechanical valve.

Figure 2:
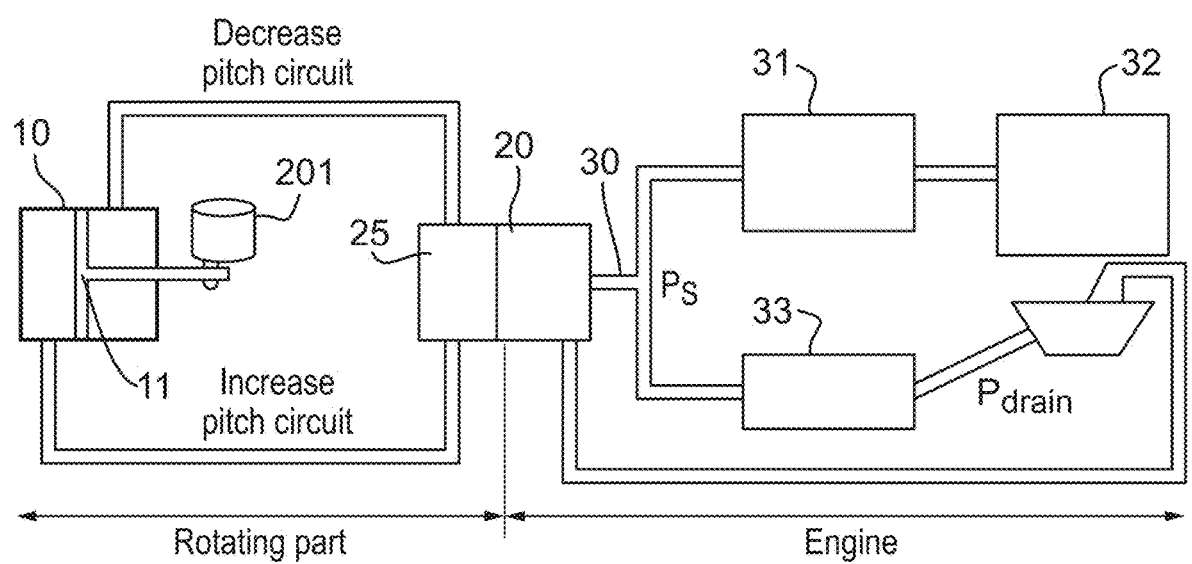
FIG. 2 shows schematically the incorporation of a servoactuator for controlling a variable-pitch propeller within an engine system.

The piston output may be used to control various movable elements. For example, in some embodiments, the piston output may be used to control the blade pitch of a variable-pitch propeller. For instance, the output of the actuator 10 may be connected to a blade root 201 of the propeller, as shown in FIG. 2. Movement of the piston 11 therefore adjusts the blade pitch. The outlets of the control valve 20 are connected to the first and second 12A,12B chambers of the actuator 10 as described above and are arranged so that increasing the pressure $P_B$ at the second chamber 12B acts to increase the blade pitch. One or more propeller pitch sensors may be provided which may be used in a known way as part of a pitch position feedback loop. The pitch position feedback loop generally monitors the current position of the piston 11 and compares this to a desired (or "target") actuator position in order to generate a command signal for moving the actuator 10 towards the target actuator position.

FIG. 2 shows schematically the integration of the variable-pitch propeller servoactuator within an oil system of an engine. As shown in FIG. 2, the control valve 20 may be provided with a pressurised supply of hydraulic fluid through a supply line 30 that is connected to the engine oil system 32 via a high pressure pump 31. Additional or secondary pumps 33 may also suitably be provided, as shown in FIG. 2. For instance, the secondary pump 33 may act as an auxiliary pump that is used in case of failure of the main supply circuit (i.e. engine oil system 32 and high pressure pump 31). The secondary pump 33 may be electrically driven and may communicate with a separate fluid tank to allow full segregation of the main and auxiliary supply circuits. The engine oil system 32 therefore acts as a reservoir of hydraulic fluid for the hydraulic actuator 10 and the pumps 31,33 determine the supply pressure $P_S$ at which the hydraulic fluid is supplied to the servoactuator.

Where the actuator 10 is used to control the blade pitch of a variable-pitch propeller as illustrated in FIG. 2, or some other rotating component, the control valve 20 may be provided alongside a hydrodynamic bearing 25 arranged to maintain the hydraulic supply connection between the static parts of the engine (such as the pumps 31,33 and the engine oil system 32) and the rotating parts (such as the propeller 201 and the associated actuator 10).

Conventionally, the hydraulic fluid is supplied to the system by a constant pressure source. That is, in conventional systems, the high pressure pump 31 is arranged to regulate the supply of hydraulic fluid to the control valve at a constant pressure. For example, for constant flow pumps, the pressure may be regulated via a pressure relief valve, whereas for self-regulating pumps, the pressure may be regulated directly in the pump. The actuator is thus controlled solely through the control valve, which modulates the power and directs the fluid, and the supply pressure $P_S$ remains constant. However, this may lead to various problems. For instance, generally, to ensure that the system works even under degraded or poor operating conditions, the hydraulic fluid is supplied constantly at the maximum power, such that during stabilised operating conditions, most of the pump energy is converted into heat via the regulation system and lost. Furthermore, in case of degraded performance, such as an increase in air content and/or compressibility of the oil, or a change in elasticity in the mechanical system, the dynamic performance of the actuator may drop.

Figure 3:
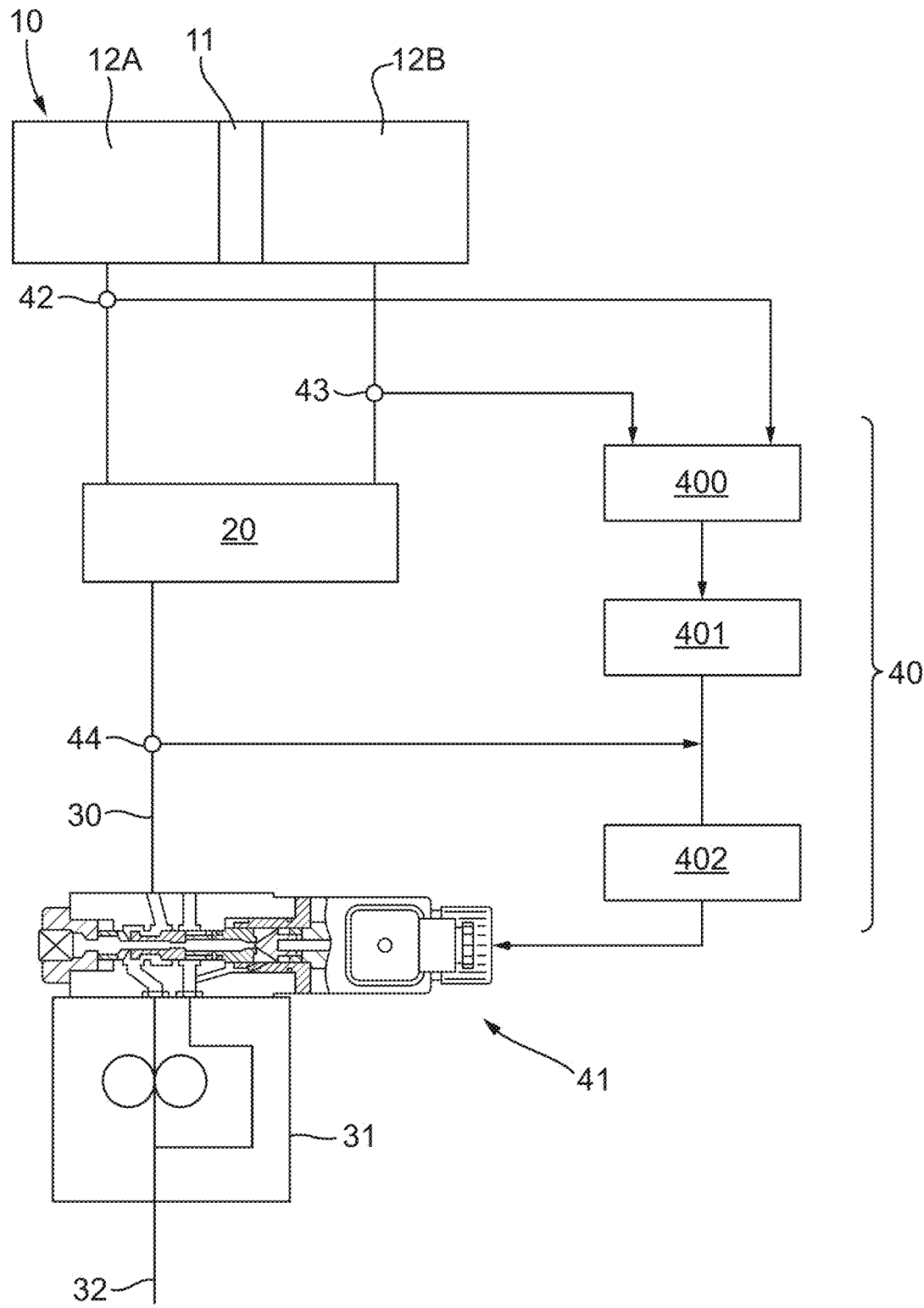
FIG. 3 illustrates a control system for controlling the supply of hydraulic fluid to a servoactuator.

Accordingly, FIG. 3 shows an implementation of a control system 40 (generally, a "fluid supply controller") that allows for the actuator pressure supply to be adjusted, or substantially optimised, in use in order to better sustain the desired loads during operation. For example, by continually monitoring the operation of the actuator system, the pressure supply may be dynamically adjusted depending on the current operating conditions or state. For instance, during the stabilised phase, the pressure supply may be substantially optimised to avoid excess energy loss. On the other hand, during transient phases, the pressure supply may be adjusted or increased in order to reduce the effects of oil compressibility or mechanical elasticity within the system. The control system 40 allows for adjustment of the supply pressure by regulating the pressure at which the hydraulic fluid is provided to the servoactuator from the pump 31 based e.g. on various pressure feedbacks from the actuator 10, or the supply lines to the actuator 10, the control valve 20 and/or the supply line 30. The control system 40 thus generally comprises feedback circuitry for monitoring the pressures at various positions within the system and for adjusting the supply of hydraulic fluid accordingly. Thus, according to the techniques presented herein, the supply of hydraulic fluid to the servoactuator from a fluid supply may be adjusted through control system 40 based on feedback information relating to the servoactuator. For example, the feedback information may be used to generate a command signal for adjusting a pressure regulating valve 41 associated with the high pressure pump 31 of the oil supply 32 in order to adjust i.e. to increase or decrease the pressure at which the hydraulic fluid is supplied to the servoactuator. In other examples, the feedback information may be used to generate command signals for directly adjusting a self-regulating pump. The control system 40 may generally be implemented by one or more processors or processing units and/or by suitable electronic circuitry.

As shown schematically in FIG. 3, one or more pressure monitors may be provided for monitoring the pressure at various positions within the actuator system. Particularly, for the double-acting actuator 10 shown in FIG. 3, the pressure at each of the first chamber 12A and the second chamber 12B may be monitored by providing suitable monitors on the supply lines of both chambers 12A,12B, or by diverting a portion of the fluid for monitoring, at the positions labelled 42 and 43. As another example, pressure monitors may be installed directly within the first chamber 12A and/or the second chamber 12B.

The control system 40 may perform a series of control steps in order to adjust the supply pressure $P_S$. For instance, in a first control step 400, the monitored pressures 42,43 may be used to calculate the load on the actuator. The calculated load may then be used to determine an optimum supply pressure $P_{S,OPT}$ (step 401). The optimum supply pressure $P_{S,OPT}$ may then be compared to the supply pressure $P_S$ at the supply line 30, the supply pressure $P_S$ being the pressure at which the hydraulic fluid is being supplied to the servoactuator. The supply pressure $P_S$ may be monitored by providing a suitable pressure monitor at the position labelled 44, with the monitored value being fed back into the control system 40. The control system 40 may then generate a command signal or current based on this comparison for controlling a pressure regulating means 41 associated with the hydraulic fluid supply (step 402). The pressure regulating means 41 thus acts to regulate or adjust the pressure of the hydraulic fluid provided by the pump 31 to the servoactuator via the supply line 30. That is, the supply pressure may be adjusted based on feedback information relating to the actuator load and/or the current supply pressure $P_S$.

By providing means for dynamically adjusting the pressure at which the hydraulic fluid is supplied to the servoactuator system, it may be possible to better optimise or reduce the power consumption of the pump 31 without negatively impacting the actuator performance 10. Furthermore, it may be possible to improve the robustness of the actuation mechanism as the supply pressure may be increased to counter instabilities introduced by a change in compressibility of the fluid and/or a change in elasticity of the mechanical components. Alternatively, the techniques described herein may allow for a reduction in the supply pressure which may help to reduce mechanical stress within the actuator system thus reducing fatigue and helping improve the life time of the actuator system. The feedback systems described herein also generally allows for monitoring of the system health based on the feedback information and/or the adjustments made to the supply pressure. That is, knowledge of the pressures in the various chambers, and changes in these pressures over the lifetime of the hydraulic actuator 10, may permit diagnostic and/or prognostic analysis of the actuator system.

It will be appreciated that the control system 40 may perform various additional processing steps, and may utilise various other (feedback) information from the system. For instance, in embodiments, the pressure regulating means 41 may act to regulate or adjust the supply pressure $P_S$ in response to a request from a position feedback loop associated with the actuator 10. Thus, control systems 40 substantially of the type described herein for controlling the supply pressure $P_S$ may receive inputs from a position feedback loop for controlling the position of a hydraulic actuator 10. For example, a control system 40 incorporating a feedback circuit may be used in parallel with, and receiving input from, a pitch position feedback loop for a variable pitch propeller of the type shown in FIG. 2. That is, in embodiments, the supply pressure $P_S$ may be adjusted in order to optimise the supply pressure based on a command from the position feedback loop in order to facilitate moving the actuator towards a desired or target actuator position as determined by a position feedback loop. Alternatively put, the control system 40 may use (in step 401) feedback information relating to a current or anticipated, or target, actuator position, such as may be obtained from a position feedback loop, in determining the optimum supply pressure $P_{S,OPT}$ for the servoactuator (i.e. the optimum supply pressure for supplying hydraulic fluid to the control valve 20 for porting to the respective chambers of the hydraulic actuator 10 to move the piston 11). This may provide for a more efficient or responsive control of the blade pitch than conventional systems wherein the supply pressure is constant and the pitch position feedback loop is used only to control the relative proportions of hydraulic fluid ported to the actuator 10 by the control valve 20. Furthermore, because the supply pressure can be adjusted or controlled by the control system 40, the control valve 20 may need only to direct the fluid to the actuator 10. Thus, although the control valve 20 may be provided in the form of a servo valve, such as an EHSV, it will be appreciated that because the flow may be regulated by adjusting the pressure supply using the control means 40 a relatively simple fluid distributor or diverter may be used as the control valve 20.

Figure 4:
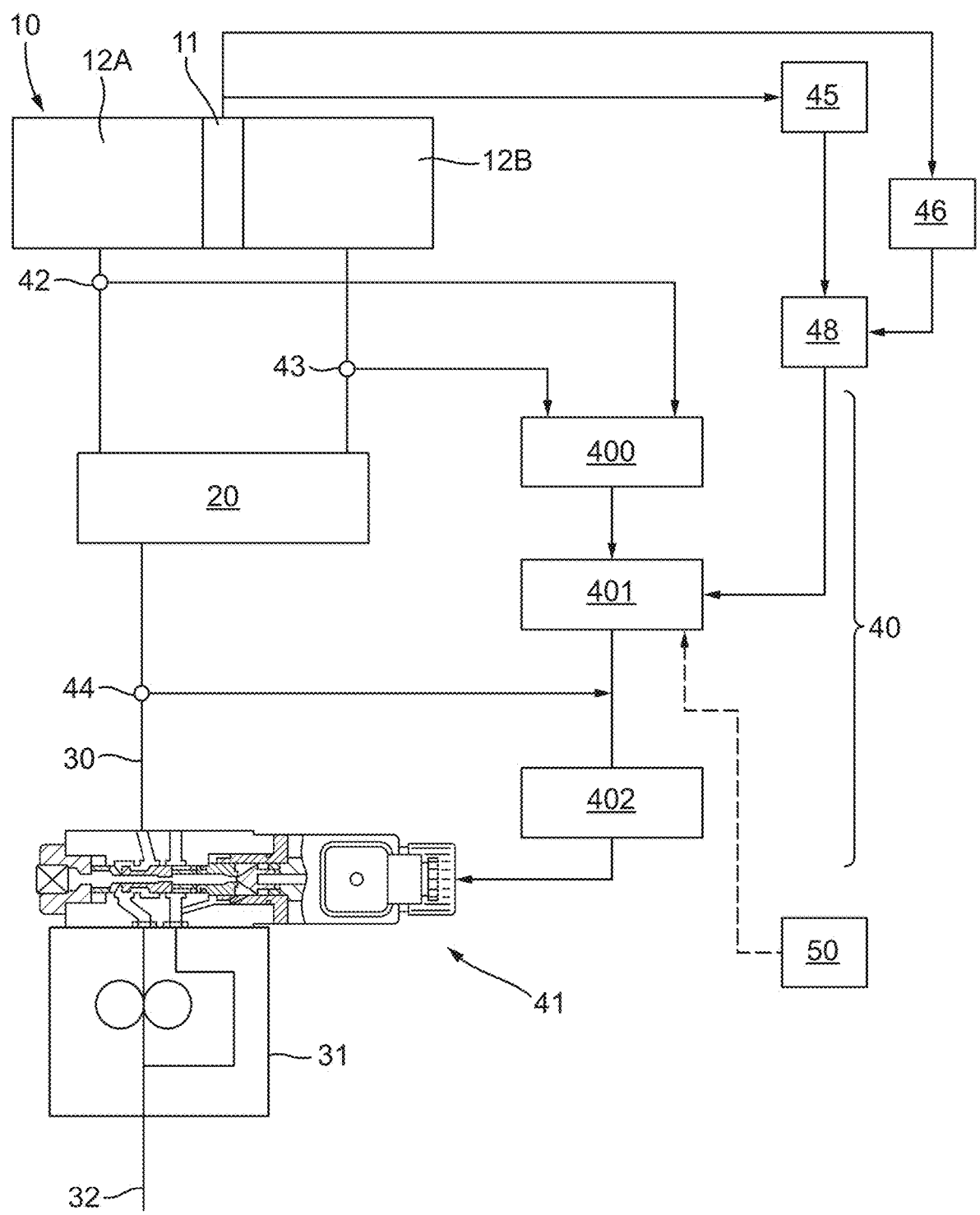
FIG. 4 illustrates another example of a control system for controlling the supply of hydraulic fluid to a servoactuator.

FIG. 4 illustrates an example of how the control system 40 may be provided with feedback information relating to the position of the actuator 10. As shown in FIG. 4, an actuator position processing unit 45 may be provided for monitoring the position of the piston 11 and providing associated feedback information to the control system 40 for use in determining the optimum supply pressure $P_{S,OPT}$. The actuator position may also be provided to a pitch position feedback loop 46. The actuator position as monitored by the actuator position processing unit 45 as well as information obtained from the pitch position feedback loop 46 may then be provided to the control system 40 for use in determining the optimum supply pressure $P_{S,OPT}$. For instance, information regarding the commanded actuation rate, or the anticipated change in the position of the piston 11 obtained from the pitch position feedback loop 46 may be provided as input to the control system 40. Particularly, the information obtained from the actuator position processing unit 45 and the pitch position feedback loop 46 may be provided as input to a control logic 48 for calculating an optimal supply pressure for the actuator. For instance, a calculation may be done based on the actuator position (e.g. as determined by the actuator position processing unit 45) and an actuator rate as determined from the pitch position feedback loop 46 in order to calculate the optimal pressure for each of the actuator chambers 12A,12B. This calculation may e.g. be based on a hydraulic equation relating the change in pressure over time, dP/dt, to the change in fluid flow, e.g. dP/dt=V $(Q_{in}-Q_{out})/B_k$, wherein V is the volume of the chamber receiving a fluid, $Q_{in/out}$ is the flow of fluid into/out of the chamber, and $B_k$ is the bulk modulus of the fluid, and then integrating the change in pressure, dP/dt, over time in order to obtain the optimal pressures $P_{A,OPT}$, $P_{B,OPT}$ for each of the actuator chambers 12A,12B. The optimal supply pressure, $P_{S,OPT}$, may thus be set based on the optimal pressures $P_{A,OPT}$, $P_{B,OPT}$ for each of the actuator chambers 12A,12B, for instance, the optimal supply pressure may be determined based on the maximum pressure required for the two chambers. The supply pressure may thus adjusted or substantially optimised based on information received from the pitch position feedback loop 45 in order to more efficiently move the piston 11 towards the target actuator position.

As another example, the control system 40 may optionally also be provided with inputs from a "shunt logic" 50 for providing information relating to the operation of the aircraft or system within which the actuator is installed. For instance, the shunt logic 50 may use external inputs to set the supply pressure to a predetermined, fixed value in order to accommodate a specific flight condition of the aircraft. Other inputs to the shunt logic 50 might e.g. include calculated actuator loads as a function of the oil temperature, information relating to the aerodynamic properties of the propeller, or a rate of rotation of a propeller.

In general, the optimal supply pressure may be determined using a combination of inputs of the types described above. For instance, the optimal supply pressure may be determined using a combination of information received from the actuator 10 (e.g. the pressures in the supply lines), and from the pitch position feedback loop 45, as well as from the shunt logic 50.

Although FIGS. 3 and 4 show a series of separate components for performing the various steps described above, it will be appreciated that various information associated with the system may be monitored and used by the different components of the control system 40 in various suitable ways, and in various combinations. For instance, the actuator position processing unit 45 of FIG. 4 may also use the monitored pressures 42,43 and/or the determined actuator load in order to determine the actuation rate or an anticipated change in the position of the piston 11. Thus, it will be appreciated that the processing steps described herein are merely exemplary and that various additional processing steps may be performed, or various combinations of processing steps may be performed simultaneously at a single processor or processing unit.

Figure 5:
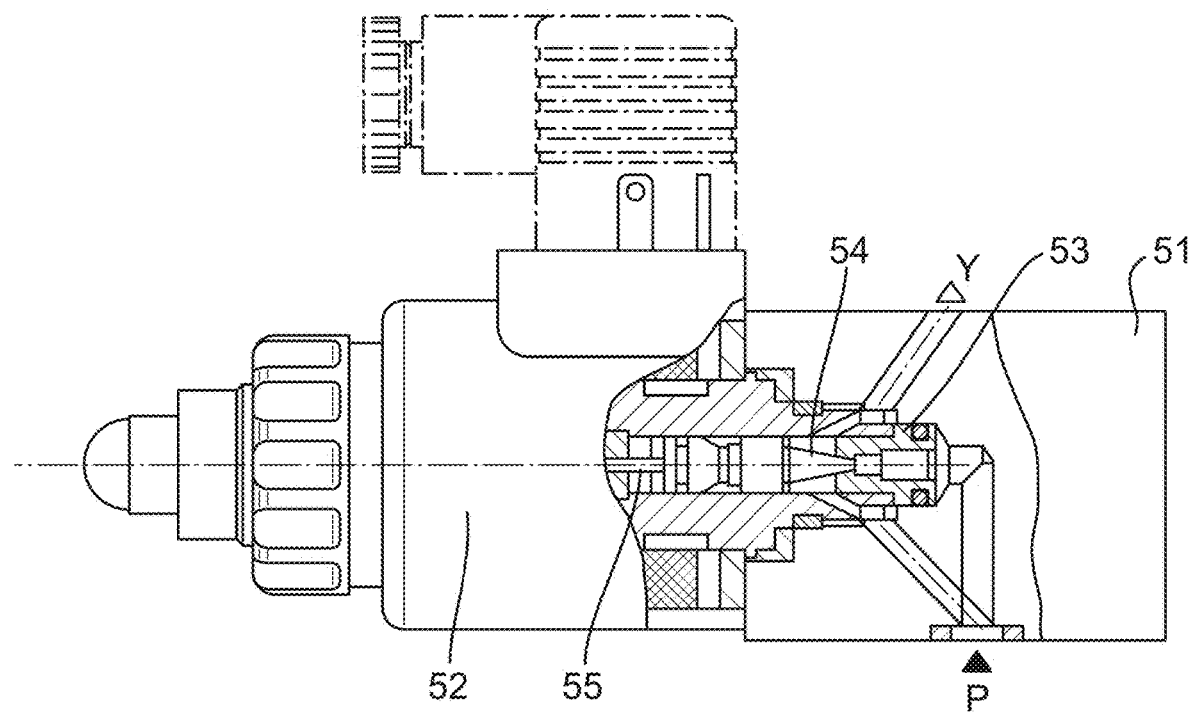
FIG. 5 shows an example of a suitable pressure regulating means for use in a control system of the type shown in FIG. 3 or FIG. 4.

The pressure regulating means 41 may be provided in the form of a valve located between the fluid supply and the servoactuator such that the pressure regulating valve 41 is operatively associated with the fluid supply. For example, the pressure regulating valve 41 may typically be located between the pump 31 and the control valve 20 of the servoactuator. Various suitable pressure regulating valves 41 may be used to control the supply of hydraulic fluid. For instance, the valve 41 may comprise a direct drive valve, or may be electro hydraulically controlled. However, in embodiments, the pressure regulating valve 41 may comprise a proportional solenoid. The feedback circuit of the control system 40 may thus generate a command signal or current for commanding the proportional solenoid to adjust the supply pressure. An example of a suitable proportional solenoid is shown schematically in FIG. 5. In particular, FIG. 5 shows a proportional pressure relief valve. The valve shown in FIG. 5 comprises a housing 51, a proportional solenoid 52, a valve seat 53 and a valve poppet 54. The proportional solenoid 52 comprises a central thread and detachable coil, and the interior of the solenoid is connected to an outlet port Y and filled with hydraulic fluid via inlet port P. In order to set the system pressure, a command value is specified by the control electronics (provided by control system 40, as above), and depending on the command value, the electronics actuate the solenoid with electric current. The proportional solenoid 52 thus converts the electric current into a mechanical force that acts on the valve poppet 54 via an armature plunger 55. The valve poppet 54 presses on the valve seat 53 to interrupt the connection between inlet port P and outlet port Y. If the hydraulic force on the valve poppet 54 equals the solenoid force the valve controls the set pressure by lifting the valve poppet 54 off the valve seat 53 to enable hydraulic fluid flow from inlet port P to outlet port Y. On the other hand, if the command value is zero, or if the electrical supply is lost, the control electronics only applies the minimum control current to the proportional solenoid 52 and the maximum set pressure may be applied to ensure that full pump power is available even if the electrical supply of the solenoid is lost. The control electronics, or part of the control electronics, may be integrated with the valve.

In other examples, the pressure supply or pump itself may be self-regulating such that the pressure supply itself is directly adjustable in order regulate the pressure. That is, the pump may be a self-regulating pump having the required logic and control system embedded within the pump.

Although the techniques presented herein have been described with reference to particular embodiments, it will be understood by those skilled in the art that various changes in form and detail may be made without departing from the scope of the invention as set forth in the accompanying claims. For instance, it will be apparent that the techniques presented herein may generally be applied to any hydraulic actuation system, and are not limited e.g. to blade pitch control actuators.

The invention claimed is:

1. A hydraulic actuation system comprising:
    a servoactuator comprising a hydraulic actuator and a control valve for controlling porting of hydraulic fluid to said actuator;
    said control valve comprising a spool and device for positioning the spool; and
    a fluid supply controller for controlling a supply of hydraulic fluid from a fluid supply to said servoactuator, the fluid supply controller comprising a feedback system for receiving information relating to the operation of the hydraulic actuation system, the fluid supply controller configured to adjust the supply of hydraulic fluid based on said information,
    wherein said fluid supply controller acts to adjust a supply pressure ($P_s$) at which the hydraulic fluid is supplied to said servoactuator; and
    wherein said information comprises a position or a target position of the hydraulic actuator;
    wherein said position is further adjusted by a feedback device connected between the spool and the device for positioning the spool.

2. The system of claim 1, wherein said fluid supply comprises a reservoir and a pump for retrieving hydraulic fluid from said reservoir and pumping said hydraulic fluid to said servoactuator.

3. The system of claim 1, wherein said fluid supply controller comprises an adjustable pressure regulating valve operatively associated with said fluid supply for adjusting the pressure at which the hydraulic fluid is supplied to said servoactuator.

4. The system of claim 1, wherein said fluid supply controller comprises a self-regulating pressure supply or pump.

5. The system of claim 1, wherein said information comprises information relating to the operation of the actuator such as a pressure and/or differential pressure associated with said hydraulic actuator or with one or more chambers of said hydraulic actuator.

6. The system of claim 1, wherein said information comprises information relating to the operating of said control valve and/or information relating to the pressure at which the hydraulic fluid is supplied to said servoactuator.

7. The system of claim 1, comprising a position feedback loop for determining a target position and/or target actuation rate of the hydraulic actuator, wherein said fluid supply controller adjusts the supply or supply pressure of hydraulic fluid to said servoactuator based on information obtained from said position feedback loop.

8. The system of claim 1, comprising one or more pressure and/or flow monitors for monitoring the operation of the hydraulic actuator and/or control valve and/or for monitoring the pressure at which the hydraulic fluid is supplied to said servoactuator.

9. The system of claim 1, wherein said control valve comprises a servovalve, such as an electrohydraulic servovalve, or wherein said control valve comprises a direct drive valve, or a hydromechanical valve.

10. A variable pitch propeller system comprising a hydraulic actuation system as claimed in claim 1, wherein said hydraulic actuator is operatively connected to a propeller blade for adjusting the pitch of said propeller blade.

11. An aircraft comprising a hydraulic actuation system as claimed in claim 1, wherein said fluid supply comprises a supply of lubricant from an engine of the aircraft.

12. A ship comprising a hydraulic actuation system as claimed in claim 1, wherein said fluid supply comprises a supply of lubricant from an engine of the ship.

13. An aircraft comprising a hydraulic actuation system, the hydraulic actuation system comprising:
    a servoactuator comprising a hydraulic actuator and a control valve for controlling porting of hydraulic fluid to said actuator;
    said control valve comprising a spool and device for positioning the spool; and
    a fluid supply controller for controlling a supply of hydraulic fluid from a fluid supply to said servoactuator, the fluid supply controller comprising a feedback system for receiving information relating to the operation of the hydraulic actuation system, the fluid supply controller configured to adjust the supply of hydraulic fluid based on said information,
    wherein said fluid supply controller acts to adjust a supply pressure ($P_s$) at which the hydraulic fluid is supplied to said servoactuator; and
    wherein said information comprises a position or a target position of the hydraulic actuator;
    wherein said position is further adjusted by a feedback device connected between the spool and the device for positioning the spool.

14. A ship comprising a hydraulic actuation system, the hydraulic actuation system comprising:
    a servoactuator comprising a hydraulic actuator and a control valve for controlling porting of hydraulic fluid to said actuator;
    said control valve comprising a spool and device for positioning the spool; and
    a fluid supply controller for controlling a supply of hydraulic fluid from a fluid supply to said servoactuator, the fluid supply controller comprising a feedback system for receiving information relating to the operation of the hydraulic actuation system, the fluid supply controller configured to adjust the supply of hydraulic fluid based on said information,
    wherein said fluid supply controller acts to adjust a supply pressure ($P_s$) at which the hydraulic fluid is supplied to said servoactuator; and
    wherein said information comprises a position or a target position of the hydraulic actuator;
    wherein said position is further adjusted by a feedback device connected between the spool and the device for positioning the spool.

\* \* \* \* \*